United States Patent
Beckerman et al.

(10) Patent No.: US 6,959,777 B2
(45) Date of Patent: Nov. 1, 2005

(54) HIGH VOLTAGE ENERGY REGULATED CONVERSION CIRCUIT

(75) Inventors: Joel Beckerman, Canton, MI (US); Joseph Carl Burba, Dexter, MI (US); Matthew Roger DeDona, Northville, MI (US); Raymond Spiteri, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,692

(22) Filed: Oct. 5, 2001

(65) Prior Publication Data

US 2003/0066695 A1 Apr. 10, 2003

(51) Int. Cl.[7] .............................. B60K 1/00; H02G 3/00; H02H 7/06; H02P 5/00
(52) U.S. Cl. ..................... 180/65.1; 180/65.2; 307/10.1; 322/28; 318/139
(58) Field of Search ................................ 180/65.1, 65.2, 180/65.3, 65.8; 701/22; 307/9.1, 10.1

(56) References Cited

U.S. PATENT DOCUMENTS

| 5,298,851 A | * | 3/1994 | DeNardis .................. 322/28 |
| 5,549,174 A | * | 8/1996 | Reis ............................ 180/165 |
| 5,707,115 A | | 1/1998 | Bodie et al. |
| 5,847,520 A | * | 12/1998 | Theurillat et al. ........... 318/139 |
| 5,858,568 A | | 1/1999 | Hsu et al. |
| 5,886,509 A | * | 3/1999 | Fischer et al. .............. 323/268 |
| 5,941,328 A | | 8/1999 | Lyons et al. |
| 6,044,922 A | | 4/2000 | Field |
| 6,223,106 B1 | * | 4/2001 | Yano et al. ..................... 701/22 |
| 6,232,744 B1 | * | 5/2001 | Kawai et al. ................ 320/132 |
| 6,335,575 B1 | * | 1/2002 | Reutlinger et al. ......... 307/10.1 |
| 6,486,568 B1 | * | 11/2002 | King et al. .................... 307/66 |
| 6,486,571 B1 | * | 11/2002 | Miller et al. ................. 307/140 |
| 2002/0070556 A1 | * | 6/2002 | Patel et al. ................ 290/40 C |
| 2002/0105227 A1 | * | 8/2002 | Nerone et al. ............. 307/10.1 |

* cited by examiner

*Primary Examiner*—Brian L. Johnson
*Assistant Examiner*—G B Klebe
(74) *Attorney, Agent, or Firm*—Artz & Artz, P.C.; Carlos L. Hanze

(57) ABSTRACT

A high-voltage energy regulated conversion circuit (HVERCC) (12) for electrically coupling to a vehicle bus (24) is provided. The HVERCC (12) includes a high-voltage energy converter (HVEC) module (22) coupled to the vehicle bus (24), a battery-pack high-voltage bus battery bus (28), and a WEG heater bus (29). The battery bus (28) is coupled to a high-voltage battery pack (30) and a WEG heater circuit (32). The HVEC module (22), the high-voltage battery pack (30), and the WEG heater circuit (32) are coupled to a logic controller (14) via a network (36). The logic controller (14) regulates the power on the vehicle bus (24), the battery bus (28), and the WEG heater bus (29). An operational method for the HVEC module (22) is also provided.

18 Claims, 6 Drawing Sheets

HIGH VOLTAGE ENERGY REGULATED CONVERSION CIRCUIT

BACKGROUND OF INVENTION

The present invention relates generally to a hybrid electric vehicle and more particularly, to an apparatus and method for regulating the power of a vehicle high-voltage bus.

The development of alternative energy sources for use in automotive vehicles is a goal of automobile manufacturers. The alternative energy sources must provide the required power needed to operate a vehicle and at the same time be energy efficient, reduce emissions, and be cost effective. One such alternative energy source under consideration is a fuel cell energy system. Fuel cell technology is continuously being improved for use in Electric Vehicles (EVs). A fuel cell is a very efficient power source, which is capable of providing the power needs required for an automotive vehicle. The fuel cell also produces zero emissions.

EVs have an electric propulsion system. An electric propulsion system has a fuel cell, an electric motor/generator, and a battery. The fuel cell creates electric energy, which is either stored in the battery or used in propelling the automotive vehicle. The electric energy created by the fuel cell powers the electric motor/generator in turn propelling the automotive vehicle. The electric motor/generator besides propelling the automotive vehicle also provides regeneration of power during vehicle braking. The electric motor/generator converts mechanical energy during braking to electrical energy that is then stored in the battery. This is often referred to as regeneration braking. The stored electrical energy in the battery is also used for onboard systems such as air conditioning systems, lighting systems, audio/visual systems, and other electrical systems.

Several fuel cell energy system designs require a high voltage energy source to startup and shutdown the fuel cell energy system. Fuel cells produce energy but do not provide energy storage. Fuel cell energy systems also require transient load assist during energy load events and energy storage during brake regeneration events that can not be supported by the fuel cell energy system alone. Additionally, in order for EVs to be practical for operator use, heightened requirements have been introduced, which include increased fuel efficiency and quicker power reaction times. Power reaction time refers to the amount of time required for a fuel cell system to react to power demands from an operator or needed for different driving conditions.

Furthermore, current fuel cell propulsion systems do not maximize the fuel cell operating time such that it is during the fuel cell's most efficient operating state. Fuel cells have an optimum operating power range within upper and lower limits. Fuel cells are most efficient at steady state or in other words when producing a constant power output. Fuel cells are not as efficient when operated close to and beyond the upper and lower limits. The time the fuel cell is operating at optimum temperature is also not maximized, which may cause significant energy loss.

Therefore, a need exists to support activities during increased energy load events beyond which the fuel cell is able to handle. Also a need exists to store energy during times when extra energy is available. Both of the above needs should be performed as efficiently as possible as to conserve energy.

Moreover, a need exists to utilize the power generated from the fuel cell energy system during the fuel cell's optimum operating state and temperature. By best utilizing and conserving energy the fuel cell energy system is more efficient and cost effective.

SUMMARY OF INVENTION

The forgoing and other advantages are provided by a high-voltage energy regulated conversion circuit (HVERCC) for coupling to a vehicle bus. The HVERCC includes a high-voltage energy converter (HVEC) module electrically coupled to the vehicle bus, a battery bus, and a water ethylene gylcol (WEG) heater bus. The battery bus is coupled to a high-voltage battery pack. The WEG heater bus is coupled to a WEG heater circuit. The HVEC module, the high-voltage battery pack, and the WEG heater circuit are coupled to a logic controller via a network. The logic controller regulates the power on the vehicle bus, the battery bus, and the WEG heater bus.

An operational method for the HVEC module is also provided, which includes receiving an operational command signal. Upon receiving the operational command signal the HVEC module operates in a determined functional mode. The HVEC module is continuously voltage guarding the vehicle bus, the battery bus, and the WEG heater bus.

The present invention has several advantages over the existing fuel cell energy systems. The present invention provides an apparatus that automatically regulates the voltage limits on the vehicle bus, the battery bus, and the heater bus, m turn maintaining a steady-state power output on the fuel cell. Maintaining a steady-state power output on the fuel cell provides a most efficient use of the fuel cell energy.

The present invention provides a fuel cell energy system with an auxiliary power source that is monitored, regulated and controlled. The auxiliary power source supplies additional energy when needed and provides energy storage for reuse at a future time.

Yet another advantage of the present invention is the ability of the WEG heater circuit to use extra power created by the fuel cell in an efficient manner. The ability to use the extra power prevents the fuel cell from operating at the upper voltage limit.

Therefore, a fuel cell energy system that is efficient, practical, and cost effective is possible due to the combination of the aforementioned advantages and others of the present invention.

The present invention itself, together with further objects and attendant advantages, is best understood by reference to the following detailed description, with reference to the accompanying drawings.

BRIEF DESCRIPTION OF DRAWINGS

For a more complete understanding of this invention reference should now be had to the embodiment(s) illustrated in greater detail in the accompanying drawing(s) and described below by way of (an) example(s) of the invention.

In the drawings.

DETAILED DESCRIPTION

Figure 1:
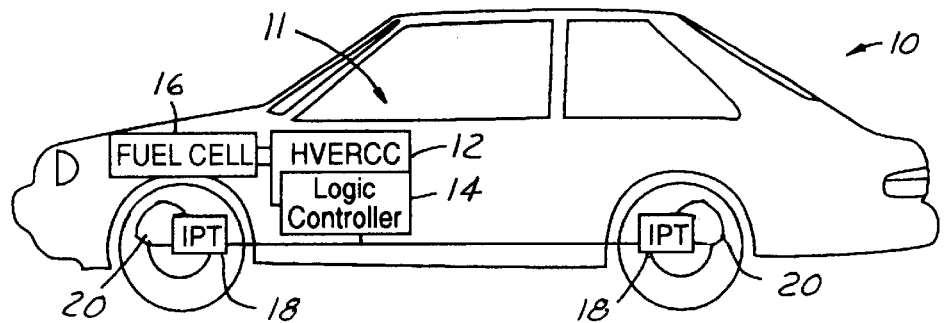
FIG. 1 is a perspective view of an automotive vehicle having a high-voltage energy regulated conversion circuit (HVERCC) according to the present invention.

In the following figures the same reference numerals are used to refer to the same components or features of the present invention. The present invention may be applied in various applications such as Electric Vehicles (EVs), Hybrid Electric Vehicles (HEVs), fuel cell energy systems, alternative energy systems, or other various applications that require power regulation.

Referring now to FIG. 1, a perspective view of an automotive vehicle 10 having an interior cabin area 11 and a high-voltage (HV) energy regulated conversion circuit (HVERCC) 12 is shown. The HVERCC 12 is connected to a logic controller 14. The logic controller 14 controls the operation of the HVERCC 12 in conjunction with a fuel cell 16, which is also connected to the HVERCC 12. The logic controller 14 may be included in the HVERCC 12 as shown, or may be a separate independent component. The HVERCC 12 and the fuel cell 16 provide energy for vehicle system functions and for propelling the automotive vehicle 10. The HVERCC 12 also stores energy provided from integrated power train (IPT) modules 18. The IPT modules 18 transfer brake regeneration energy created from the vehicle 10 braking system 20 to the HVERCC 12. The IPT modules 18 also propel automotive vehicle 10 using energy created from fuel cell 16. The quantity and location of the IPT modules 18 vary depending on the type of vehicle.

The fuel cell 16 has an optimum operating power range and temperature. A purpose of the HVERCC 12 is to maintain the proper operating power range and ideal temperature of the fuel cell 16 so as to keep the fuel cell 16 operating at peak performance.

Figure 2:
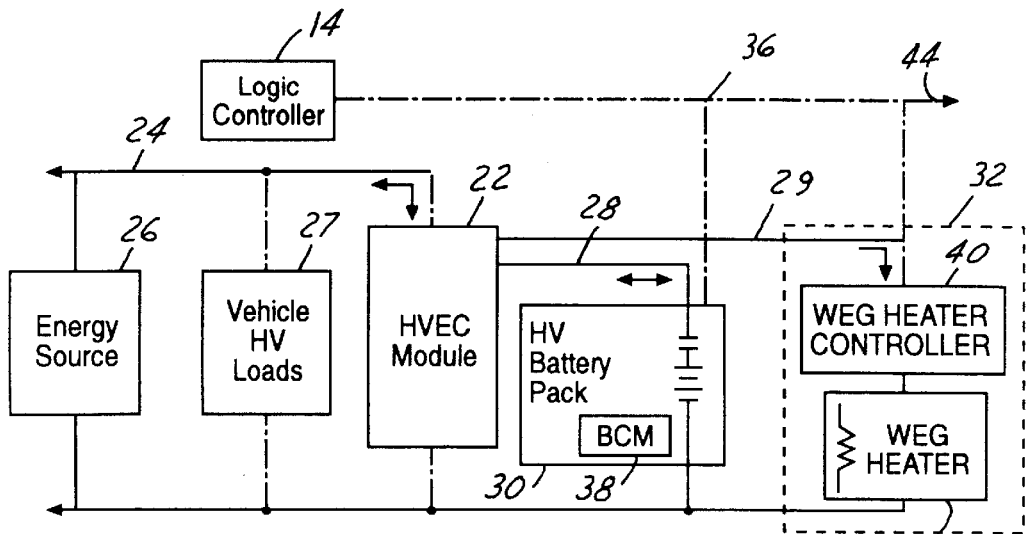
FIG. 2 is a schematic diagram of a HVERCC according to the present invention.

Referring now to FIG. 2, a schematic diagram of the HVERCC 12 according to the present invention is shown.

The HVERCC 12 includes a high-voltage energy converter (HVEC) module 22 connected to a vehicle HV bus (vehicle bus) 24. The vehicle bus 24 is connected to the vehicles HV energy sources 26 and the vehicle HV loads 27. The vehicles HV energy sources 26 may include the fuel cell 16, the IPT modules 18, or other HV energy sources. The HVEC module 22 is also connected to a battery pack high-voltage bus (battery bus) 28 and a WEG heater high-voltage bus 29. The HVEC module 22 regulates the power on the vehicle bus 24, the battery bus 28, and the heater bus 29. The battery bus 28 is connected to a HV battery pack 30. The heater bus 29 is connected to a WEG heater circuit 32. The HVEC module 22, HV battery pack 30, and the WEG heater circuit 32 are connected to a logic controller 14 via a Controller Area Network (CAN) 36. Although the present invention uses CAN 36 other networks may be used.

One example of the HVEC module 22 of the present invention is a voltage or current controlled bidirectional energy conversion module. The HVEC module 22 may contain power conversion electronics and controls to support power conversion between the vehicle bus 24, battery bus 28, and the heater bus 29.

The HVEC module 22 of the present invention provides voltage guarding and power limiting benefits for the vehicle bus 24, the battery bus 28, and the heater bus 29. The HVEC module 22 is capable of autonomously monitoring the voltage and power limits on each bus and adjusting each bus accordingly. The HVEC module 22, relative to a logic controller 14, is much quicker in adjusting the energy levels on the vehicle bus 24, the battery bus, and the heater bus 29. The HVEC module 22 reaction time is approximately a hundred times faster as compared to a logic controller operating a HVEC module 22, which takes approximately ten milliseconds between messages. The speed of the HVEC module 22 allows sinking power from the vehicle bus 24 when it reaches a predetermined upper limit $V_{GMAX}$ and sourcing power when it reaches a predetermined lower limit $V_{GMIN}$ as shown in FIGS. 5B and 7B. These quick adjustments help to maintain a preferred steady state on the vehicle bus 24 providing peak operating performance of the fuel cell 16.

The HVEC module 22 has several functional modes and a standby mode. The functional modes include a constant voltage mode, a constant current mode, and a battery constant current mode. During the constant voltage mode the HVEC module 22 regulates and maintains a constant voltage on the vehicle bus 24. The optimum voltage range for the vehicle bus 24 is approximately 250V to 400V during normal driving conditions. During the constant current mode the HVEC module 22 regulates and maintains a constant current flow on the vehicle bus 24. The optimum current range is approximately between −100A when sourcing power and 100A when sinking power. During battery constant current mode the HVEC module 22 maintains a constant current state of charge (SOC) rating on the battery bus 28. The current range on the battery bus is between 140A when sourcing power and 100A when sinking power. The voltage range is 150V to 300V when sourcing power and 250V to 300V when sinking power.

During all functional modes the HVEC module 22 is also voltage guarding the vehicle bus 24, battery bus 28, and heater bus 29. Voltage guarding refers to the HVEC module's 22 ability to monitor and limit the voltage transferred on each bus by adjusting the current transfer rates through the HVEC module 22. The HVEC module 22 stabilizes the voltage on whichever bus reaches a voltage guard limit and prevents that particular bus from exceeding the voltage guard limit. The logic controller 14 sets the voltage guard limits. When a voltage guard limit has been reached the HVEC module 22 signals the logic controller 14. The logic controller 14 then provides further precautionary actions by sinking or sourcing power through the HVEC module 22.

Standby mode is when HVEC operation is not required. Idle mode is used to conserve energy. During standby mode the HVEC module 22 monitors and reports voltage and currents until it receives a functional mode signal. The HVEC module provides voltage guarding in all modes for the vehicle bus 24, the battery bus 28, and the heater bus 29. The HVEC module 22 has a peak power throughput rating of approximately 20 kW.

The HV battery pack 30 supplies auxiliary power to the HVEC module 22. The HV battery pack 30 also stores energy transferred from HV energy sources 26 through the HVEC module 22. The HV battery pack 30 has a battery control module (BCM) 38 for monitoring different aspects of the HV battery pack 30 such as voltage, current, power available, temperature, and health of the HV battery pack 30. The BCM 38 also assists the logic controller 14 in not overcharging the HV battery pack 30 and maintaining a proper SOC. The logic controller 14 adjusts the power on the battery bus 28 in response to a signal from the BCM 38 by signaling the HVEC module 22.

The WEG heater circuit 32 has a WEG heater controller 40 and a water ethylene glycol (WEG) heater 42. The controller 40 adjusts the amount of voltage across and current entering the WEG heater 42. The WEG heater 42 dissipates extra energy transferred from the HVEC module 22 to heat the interior cabin area 11. The HVEC module 22 may have a constant current and power mode to support the WEG heater 42. The WEG heater 42 is controlled mutually exclusive from the vehicle bus 24, and the battery bus 28. The WEG heater 42 maximum power throughput rating is approximately 15 kW. Voltage guarding is active while supplying power to the WEG Heater 42.

The extra energy produced by the fuel cell 16 may also be transferred to either a load dump resistor (not shown) or a high temperature coolant loop (also not shown) for heating the fuel cell 16. During fuel cell 16 start-up the energy transfer to heat the high temperature coolant loop brings the fuel cell 16 up to optimum operating temperature quicker.

The logic controller 1 4 is responsible for energy management on the vehicle bus 24, the battery bus 28, and the heater bus 29 by connecting, starting, recovering, dissipating, and stopping the flow of energy on these buses. The logic controller 14 monitors the energy level on the fuel cell 16, IPT modules 18, and other HV energy sources 26, which are connected to the vehicle bus 24 and regulates the voltage on the vehicle bus 24. The logic controller 14 maintains the voltage on the vehicle bus 24 between $V_{GMAX}$ and $V_{GMIN}$. During startup the fuel cell 16 requires additional voltage, therefore the logic controller 14 signals the HVEC module 22 to raise the voltage up to 450V on the vehicle bus 24. The HVEC module 22 sources power at 450V from the battery bus 28 to the vehicle bus 24. As soon as the fuel cell 16 is started the logic controller 14 reduces the voltage on the vehicle bus 24 down to 200V in order to raise the temperature of the fuel cell 16 in a shorter period of time. Reaching optimum operating temperature in a shorter amount of time allows for better efficient use of fuel cell 16 energy. The logic controller 14 signals the HVEC module 22 to either accept power from or deliver power to the vehicle bus 24 in order to maintain the power on the vehicle bus 24 between a specified range. Additionally, the logic control module 14 may signal the HVEC module 22 to operate in constant voltage or constant current mode to support startup, including a cold start, and shutdown of the fuel cell 16. The logic controller 14 may also support maintaining the HV battery pack 30 SOC.

The CAN 36 is part of a shared automotive worldwide standard for vehicle wiring of network modules and software program protocol. The CAN 36 transfers electronic signals between the logic controller 14 and the HVEC module 22, the BCM 38, and the WEG heater controller 40. The CAN 36 may also be connected, through additional CAN Nodes 44 to electronic components.

Figure 3:
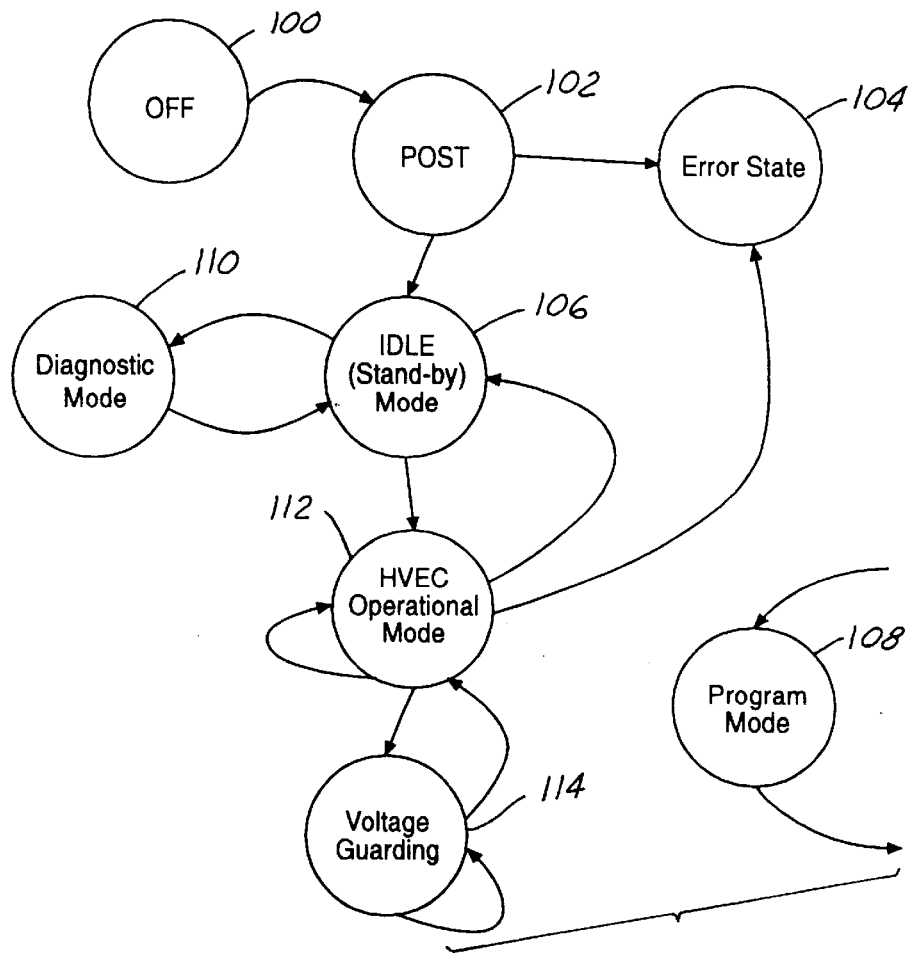
FIG. 3 is a state transition diagram of the high-voltage energy converter (HVEC) module.

Now referring to FIG. 3, a HVEC module state transition diagram is shown.

In state 1 00, the HVEC module 22 is in an "OFF" state. The HVEC module 22 is not receiving vehicle power.

In state 102, the HVEC module is powered "ON", therefore, receiving vehicle power. The HVEC module performs a power on self-test (POST) as known in the art. If a problem is detected during the POST, step 104 is executed.

In step 104, an error, fault, malfunction, or out of range flag has been detected by the logic controller 14. The HVEC module 22 sets an "Error State" and signals the logic controller an error state value.

In step 106, the HVEC module is in the idle mode. The HVEC module remains in idle mode until it receives an operational mode signal from the logic controller 14 via CAN 36.

In step 108, the HVEC module 22 is reprogrammed. The HVEC module 22 of the present invention has the ability to be reprogrammed for any updated changes in software.

In step 110, system diagnostics are performed. The HVEC module 22 has the ability for an operator to "override" normal operational functioning and perform unique independent unrelated tests. After system diagnostics are performed the HVEC module returns to stand-by mode.

In step 112, the HVEC module 22 receives an operational mode signal from the logic controller 14 to operate in one of the above mentioned functional modes. The HVEC module continues to operate in a functional mode until it either receives a signal from the logic controller 14 or the vehicle bus 24, the battery bus 28, or the heater bus 29 has reached a voltage guard limit.

In step 114, the HVEC module; 22 is operating in the voltage guard mode. The HVEC module 22 is voltage guarding the vehicle bus 24, the battery bus 28, and the heater bus 29 during all functional modes.

Figure 4A:
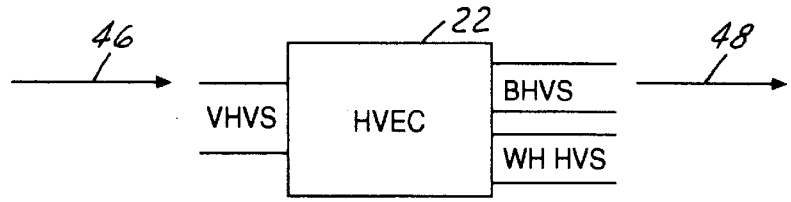
FIG. 4A is a power acceptance flow diagram of a HVEC module.

Now referring to FIG. 4A, a power acceptance flow diagram of the HVEC module 22 is shown. During power acceptance (sinking) the HVEC module 22 is receiving power 46 from the vehicle bus 24 and transferring power 48 to either the battery bus 28 or the heater bus 29. The HVEC module 22 accepts power during brake regeneration, HV battery pack 30 charging, WEG heater operation, or when the fuel cell 16 is in standby mode.

Figure 4B:
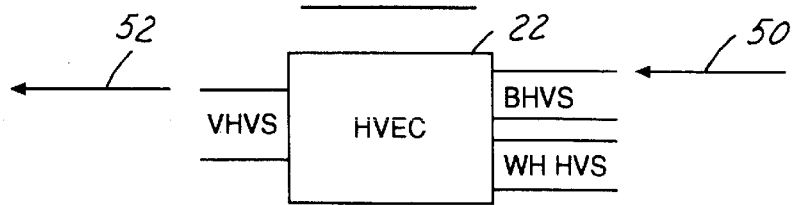
FIG. 4B is a power delivery flow diagram of the HVEC module.

Now referring to FIG. 4B, a power delivery flow diagram of the HVEC module 22 is shown. During power delivery the HVEC module 22 is receiving energy 50 from the battery bus 28 and transferring energy 52 to the vehicle bus 24. The HVEC delivers power during start-up, shutdown, transient load assist, or when charging the HV battery pack 30. Transient load assist is required when the automotive vehicle 10 is drawing extreme or large power from the vehicle bus 24 other than at start-up and shutdown.

Figure 5:
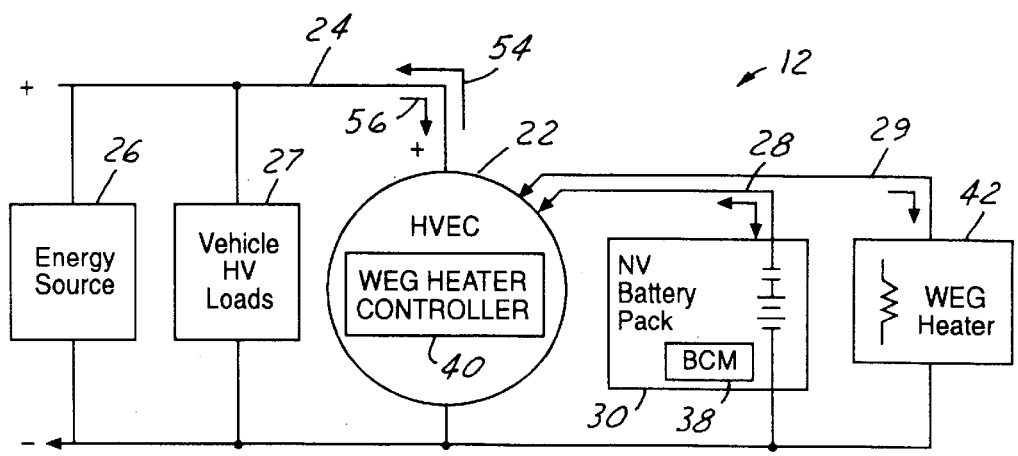
FIG. 5 is a schematic diagram of the HVERCC operating in a functional mode.

Now referring to FIG. 5, a schematic diagram of the HVERCC 12 operating in a functional mode is shown. The HVERCC 12 operates in constant voltage mode when power is delivered 54 or power is accepted 56 during startup and shutdown operations. Start-up refers to starting fuel cell 16, which includes starting fuel cell 16 during cold temperatures. Shutdown refers to stopping power generation within the fuel cell 16. During shutdown hydrogen and water is purged out of the fuel cell 16. A predetermined upper level voltage and a predetermined lower level voltage are determined for constant voltage mode. During constant voltage mode the HVEC module 22 accepts or delivers power as necessary.

Figure 6:
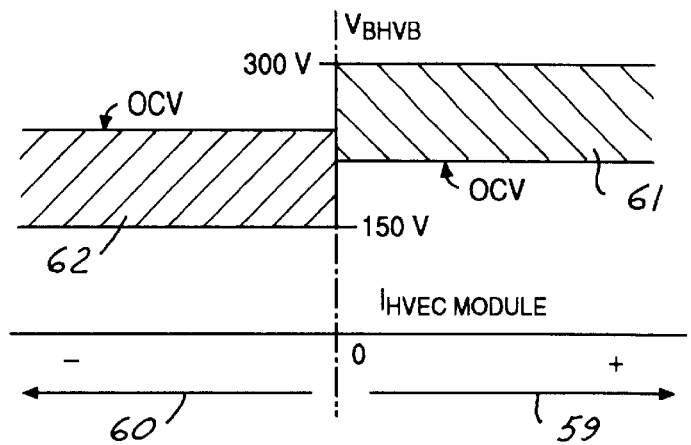
FIG. 6 is a transfer function of the battery pack high-voltage bus (BHVB) during a functional mode.

Now referring to FIG. 6, a transfer function of the battery bus 28 during a functional mode is shown. The HVEC module 22 accepts constant power from or deliver constant power to the HV battery pack 30 as needed to support constant voltage mode. The HV battery pack 30 voltage varies depending on its SOC and temperature. The HV battery pack 30 open circuit voltage (OCV) also varies during constant voltage mode. The varying voltages of the HV battery pack 30 create a battery sinking range 61 and a battery sourcing range 62 that the HV battery pack 30 operates in. The right side 59 of the transfer function refers to power accepted from the vehicle bus 24. The left side 60 of the transfer function refers to power delivered to the vehicle bus 24.

Figure 7A:
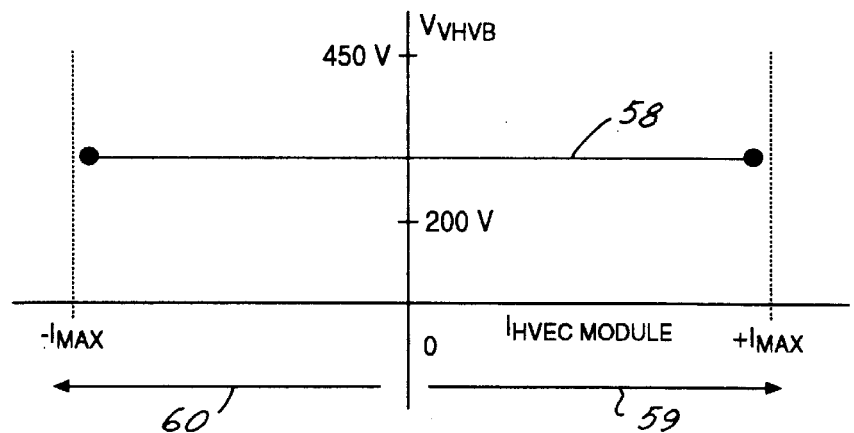
FIG. 7A is a transfer function of the vehicle high-voltage bus (VHVB) during constant voltage mode.
Figure 7B:
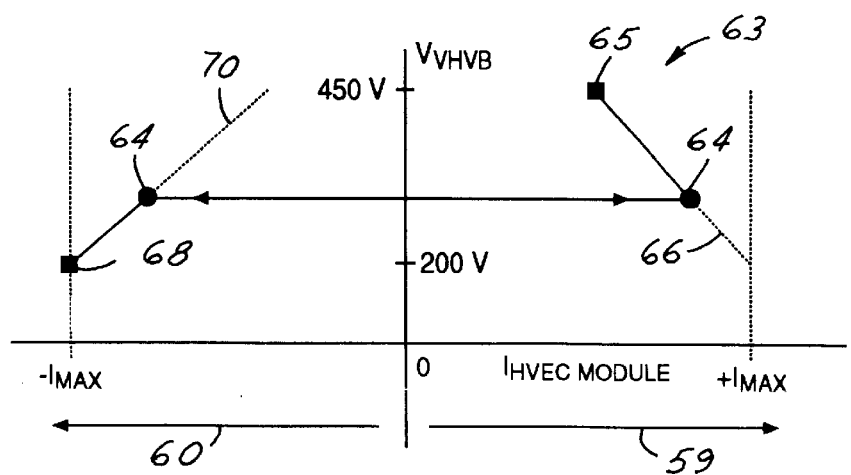
FIG. 7B is a power limiting function of the VHVB during constant voltage mode.

Now referring to FIG. 7A, a transfer function of the vehicle bus 24 during constant voltage mode is shown. The HVEC module 22 maintains a constant voltage on the vehicle bus 24 during acceptance and delivery of power, up to the maximum power capability of the combined HV energy sources 26 and the HV battery pack 30. The logic controller 14 sets a constant voltage setpoint 58 and manages to maintain the constant voltage setpoint 58 via the CAN 36. The constant voltage setpoint 58 depends on the type and characteristics of fuel cell 16.

Now referring to FIG. 7B, a power limiting function of the vehicle bus 24 during constant voltage mode is shown. The HVEC module 22 should be power limited to profile 63 during constant voltage mode. For a given constant voltage setpoint 58 the HVEC module shall sink or source current up to the maximum power limits 65. At maximum power limits 65 an overload sink or source message is preferably broadcasted to the logic controller 14 on the CAN 36. The HVEC module 22 should follow maximum power sink line 66 until the maximum vehicle bus voltage 65 is reached, while accepting power. The HVEC module 22 should follow maximum power source line 70 until the minimum vehicle bus voltage 68 is reached, while delivering power.

Figure 8:
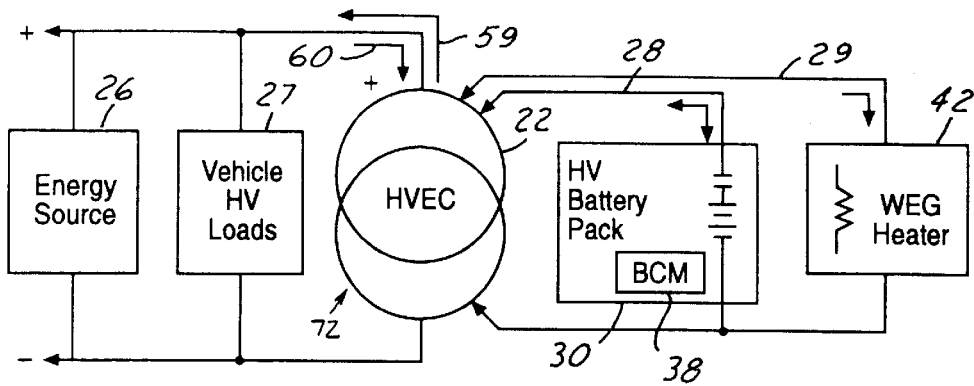
FIG. 8 is a schematic diagram of the HVERCC 12 with an expanded view of the HVEC module topology.

Now referring to FIG. 8, a schematic diagram of the HVERCC 12 with an expanded view of the HVEC module topology 72 is shown. The automotive vehicle 10 operates in constant current mode when IPT modules 18 propel vehicle 10. During constant current mode energy is balanced on the vehicle bus 24 by allocating current appropriately. The HVEC module 22 tracks the vehicle bus 24 and acts as a constant bidirectional current source within limitations of the HVEC module topology 72. The current polarity is determined based on whether the constant current is sinked (+) or sourced (−). The vehicle bus 24 voltage is monitored and compared to the voltage guard limits $V_{GMAX}$ and $V_{GMIN}$ and adjusted accordingly via CAN 36. The constant current mode supports the HV battery pack SOC maintenance. The HV battery pack 30 is charged or discharged as necessary based on the logic controller's 14 HV battery pack SOC maintenance algorithm.

Figure 9A:
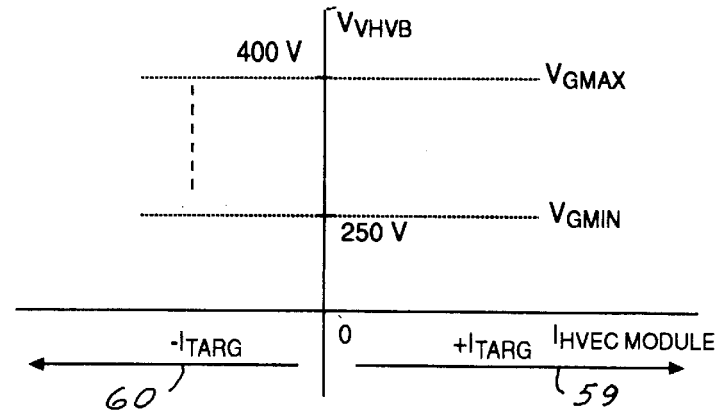
FIG. 9A is a transfer function of the VHVB during constant current mode.

Now referring to FIG. 9A, a transfer function of the vehicle bus 24 during constant current mode is shown. The HVEC module 22 accepts constant current when the power on the vehicle bus 24 is above a predetermined value by CAN 36 messaging. The HVEC module 22 delivers a constant current when the power on the vehicle bus 24 is below a predetermined value.

Now referring again to FIG. 6, the HVEC module 22 accepts constant power from or delivers constant power to the battery bus 28 as needed to support constant current mode. The HV battery pack 30 voltage varies based on its current SOC and temperature. The HV battery pack 30 OCV also varies during constant current mode.

Figure 9B:
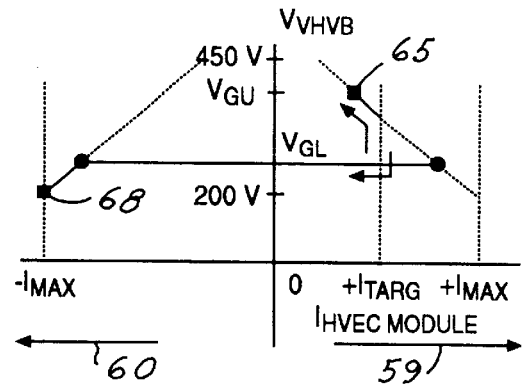
FIG. 9B is a power limiting function of the HVEC module sinking power during constant current mode.

Now referring to FIG. 9B, a power limiting function of the HVEC module 22 sinking power during constant current mode is shown. While sinking power the HVEC module 22 supplies power to the battery bus 28 or the heater bus 29 at an adjustable rate to maintain a constant positive target current $+I_{TARG}$ on the vehicle bus 24 until a low voltage guard $V_{GL}$ level is reached. The vehicle bus 24 is current controlled when vehicle bus 24 voltage is greater than or equal to battery bus 28 voltage. The HV battery pack 30 is not charged when vehicle bus 24 voltage is less than battery bus 28 voltage. During increased loading the vehicle bus 24 voltage reduces towards $V_{GL}$ and during decreased loading the vehicle bus 24 voltage increases towards an upper voltage guard $V_{GU}$ level.

Figure 9C:
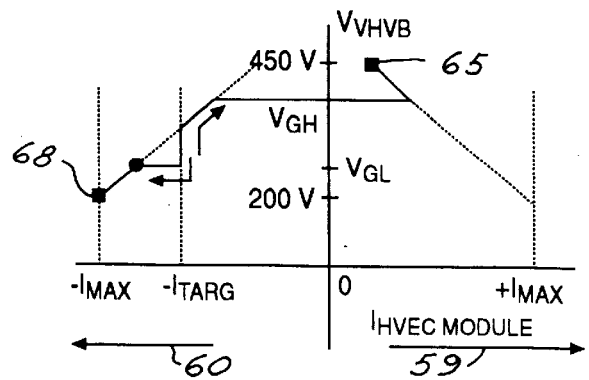
FIG. 9C is a power limiting function of the HVEC module sourcing power during constant voltage mode.

Now referring to FIG. 9C, a power limiting function of the HVEC module 22 sourcing power during constant voltage mode is shown. When the vehicle bus 24 voltage is equal to or less than a low voltage guard $V_{GL}$ level power is transferred from the battery bus 28 to the vehicle bus 24. During power sourcing the HV battery pack 30 supplies power at a rate to support constant negative target current $-I_{TARG}$ on the vehicle bus 24 until a high voltage guard $V_{GH}$ level is reached. The HVEC module 22 does not transfer power from the battery bus to the vehicle bus when the vehicle bus 24 voltage is greater than or equal to the HV battery pack 30 voltage. When the vehicle bus 24 voltage level is equal to or less than the HV battery pack 30 voltage then the vehicle bus 24 is supported by the unregulated full current capability of the HV battery pack 30. The current range of HV battery pack 30 depends on HV battery pack 30 SOC, temperature, or discharge rate. During increased loading the vehicle bus 24 voltage reduces towards $V_{GL}$ and during decreased loading the vehicle bus 24 voltage increases towards $V_{GH}$.

Now referring again to FIG. 6, the HVEC module 22, during constant battery current mode, accepts power from or delivers power to the vehicle bus 24 automatically to maintain a constant battery current rate. The constant battery current value is set via messaging using CAN 36, shown in FIG. 2. Constant battery current mode supports HV battery pack 30 SOC maintenance. The HV battery pack 30 is charged or discharged based on the logic controller's 14 HV battery pack 30 SOC maintenance algorithms. Vehicle bus 24 voltage is monitored and compared to the voltage guard limits $V_{GH}$, $V_{GU}$, and $V_{GL}$.

Figure 10A:
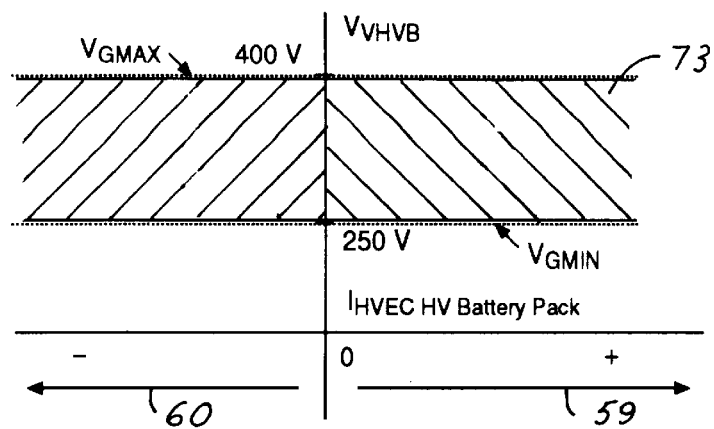
FIG. 10A is a transfer function of the VHVB during constant battery current mode.

Now referring to FIG. 10A, a transfer function of the vehicle bus 24 during constant battery current mode is shown. The HVEC module 22 sinks power or sources power from the vehicle bus 22 to support constant battery current. $V_{GMAX}$ and $V_{GMIN}$ are used to maintain the vehicle bus voltage within an efficient voltage range 73. When the logic controller sets the constant battery current setpoint equal to zero the HVEC module 22 is not transferring power and is voltage guarding the vehicle bus 24, battery bus 28, and the heater bus 29.

Figure 10B:
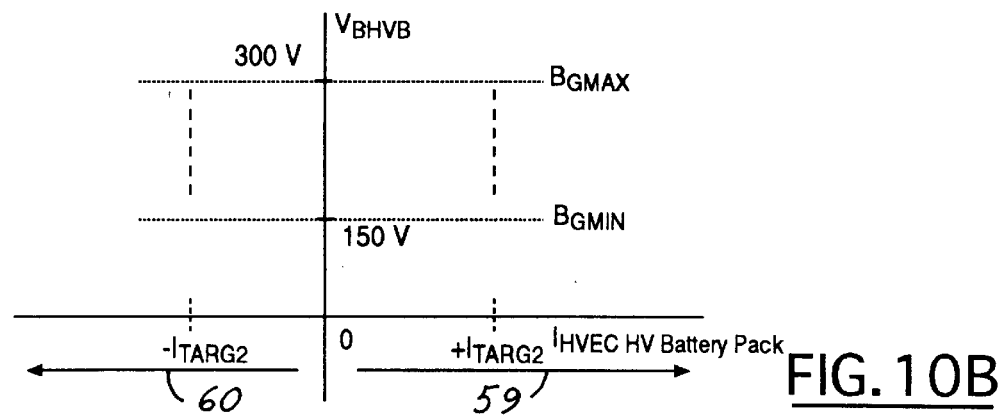
FIG. 10B is a transfer function of the BHVB during constant battery current mode.

Now referring to FIG. 10B, a transfer function of the battery bus 28 during constant battery current mode is shown. The HVEC module 22 sinks constant current from or delivers constant current to the battery bus 28 to support constant battery current mode. The battery bus 28 voltage changes based on the constant battery current rate, HV battery pack 30 SOC, and HV battery pack 30 temperature. HV battery pack 30 OCV also varies during constant battery current mode.

Figure 10C:
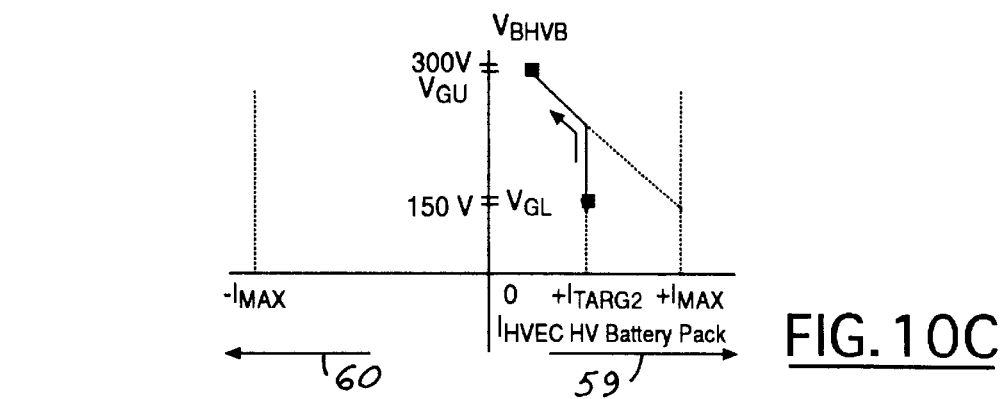
FIG. 10C is a power limiting function of the HVEC module sinking power during constant battery current mode.

Now referring to FIG. 10C, a power limiting function of the HVEC module 22 sinking power during constant battery current mode is shown. While the HVEC module 22 is sinking power the HVEC module 22 supplies power to the HV battery pack 30 or the WEG heater 42 at a rate to maintain a constant battery target current $+I_{TARG2}$ on the battery bus 28. The battery bus 28 is current controlled when vehicle bus 24 voltage is greater than or equal to battery bus 28 voltage. The HVEC module 22 sinks power up to the voltage guard upper limit $V_{GU}$ on the battery maximum sink line 74. The HVEC module 22 does not transfer power when the vehicle bus 24 voltage is less than the battery bus 28 voltage.

Figure 10D:
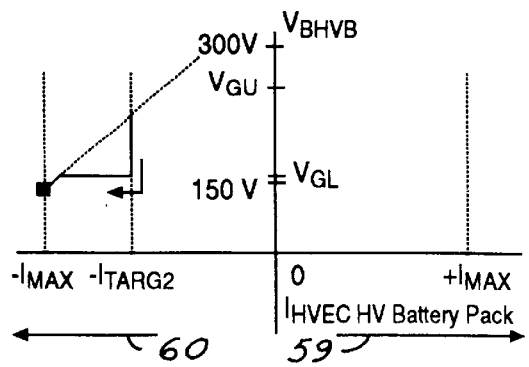
FIG. 10D is a power limiting function of the HVEC module sourcing power during constant battery current mode.

Now referring to FIG. 10D, a power limiting function of the HVEC module 22 sourcing power during constant battery current mode is shown. While the HVEC module 22 is sourcing power, the HV battery pack 30 supplies power at a rate to support constant battery target current $I_{TARG2}$ on vehicle bus 24. The HVEC module 22 does not transfer power to the vehicle bus 28 when the vehicle bus 24 voltage is greater than or equal to the battery bus 28 voltage. The HVEC module 22 sources power up to the voltage guard lower limit $V_{GL}$ on the battery minimum source line 76. The HVEC module 22 transfers power at an unregulated rate when vehicle bus 24 voltage is less than battery bus 28 voltage.

Figure 11A:
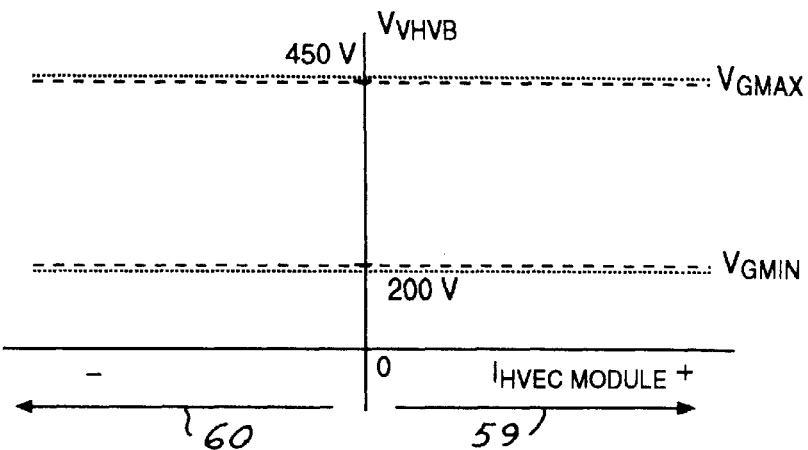
FIG. 11A is a plot of the upper and lower voltage guard limits for the VHVB during normal mode.

Now referring to FIG. 11A, a plot of the upper and lower voltage guard limits for the vehicle bus 24 during normal mode are shown. The HVEC module 22 continuously monitors vehicle bus 24 and automatically enables voltage guarding to prevent an over-voltage or under-voltage on the vehicle bus 24. The HVEC module 22 sinks power from or sources power to vehicle bus 24 automatically when either $V_{GMAX}$ or $V_{GMIN}$ are reached. The HVEC module prevents power transfer beyond $V_{GMAX}$ and $V_{GMIN}$.

Figure 11B:
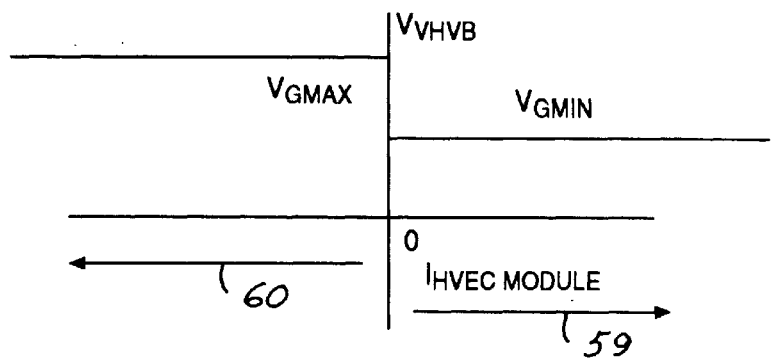
FIG. 11B is a transfer function of the VHVB during normal mode.

Now referring to FIG. 11B, a transfer function of the vehicle bus 24 during normal mode is shown. The HVEC module 22 neither accepts nor delivers power when the vehicle bus 24 voltage guard limits $V_{GMAX}$ and $V_{GMIN}$ are reached, therefore, HVEC module 22 transfer current $I_{HVEC}$ is equal to zero. The HVEC module 22 accepts constant power from or delivers constant power to the battery bus 28 as needed to support normal mode.

Now referring again to FIG. 6, the HVEC module 22, during normal mode, maintains the battery bus 28 voltage within a positive range 59 while sinking power from the vehicle bus 24 to the battery bus 28. The HVEC module 22 maintains the battery bus 28 voltage within a negative range 60 while sourcing power from the battery bus 28 to the vehicle bus 24. HV battery pack 30 voltage varies based on current SOC and temperature. HV battery pack 30 OCV also varies during normal mode.

Figure 11C:
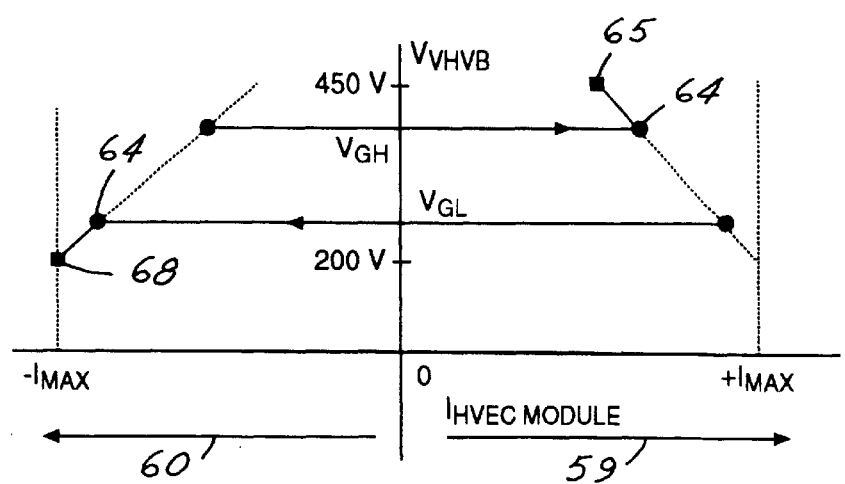
FIG. 11C is a power limiting function of the VHVB during normal mode.

Now referring to FIG. 11C, a power limiting function of the vehicle bus 24 during normal mode is shown. The HVEC module 22 is power limited to preferably 20 kW during normal mode. When the HVEC module 22 is sourcing power and the power limit 65, the HVEC module 22 signals the logic controller 14 and further reduces voltage until current through the HVEC module 22 is less then the maximum current $I_{MAX}$. During sinking the HVEC module 22 sinks current up to the maximum power limits 65 followed by increasing the voltage and reducing the current at a constant power rate, which is set by the logic controller 14.

The constructed embodiment in combination with the above described method of the present invention therefore regulates the power on the vehicle bus 24, battery bus 28, and the heater bus 29 while maintaining a constant efficient power output on the fuel cell 16. The present invention maximizes the efficiency of fuel cell 16 and provides a backup power source for during start-up and shutdown.

The above-described apparatus and method, to one skilled in the art, is capable of being adapted for various purposes and is not limited to the following applications: Electric Vehicles (EVs), Hybrid Electric Vehicles (HEVs), fuel cell energy systems, alternative energy systems, or other various applications that require power regulation. The above-described invention can also be varied without deviating from the true scope of the invention.

While particular embodiments of the invention have been shown and described, numerous variations alternate embodiments will occur to those skilled in the art. Accordingly, it is intended that the invention be limited only in terms of the appended claims.

What is claimed is:

1. A high-voltage energy regulated conversion circuit for coupling to a vehicle bus comprising:
   a high-voltage energy converter (HVEC) module electrically coupled to the vehicle bus;
   a battery bus electrically coupled to the HVEC module;
   a water ethylene glycol (WEG) heater bus electrically coupled to the HVEC module;
   a high-voltage battery pack electrically coupled to said battery bus;
   a WEG heater circuit electrically coupled to said WEG heater bus; and
   a logic controller electrically coupled to said HVEC module, said high-voltage battery pack, and said WEG heater circuit via a network, wherein said logic controller regulates the power on the vehicle bus, the battery bus, and the WEG heater bus and, wherein said HVEC module operates in multiple functional modes comprising a constant voltage mode, a constant current mode, and a constant battery current mode.

2. A circuit as in claim 1 wherein said WEG heater circuit further comprises a WEG heater.

3. A circuit as in claim 1 wherein said logic controller activates said WEG heater circuit to discharge excess battery energy.

4. A circuit as in claim 1 wherein said logic controller activates said HVEC module to accept power from the vehicle bus to said battery bus when the power level on the vehicle bus is greater than a predetermined value.

5. A circuit as in claim 1 wherein said logic controller activates said HVEC module to accept power from the vehicle bus to said heater bus when the power level on the vehicle bus is greater than a predetermined value.

6. A circuit as in claim 1 wherein said logic controller activates said HVEC module to supply power from said battery bus to the vehicle bus when the power level on the vehicle bus is less than a predetermined value.

7. A circuit as in claim 1 wherein said logic controller deactivates said HVEC module when the power level on the vehicle bus has not exceeded predetermined voltage limits.

8. A circuit as in claim 1 wherein said HVEC module maintains a state-of-charge (SOC) on said high-voltage battery pack.

9. A circuit as in claim 1 wherein said high-voltage battery pack comprises a battery control module (BCM), wherein said BCM assists said logic controller in monitoring high-voltage battery pack characteristics selected from at least one of voltage, current, power, temperature, and health of said high-voltage battery pack.

10. A circuit as in claim 9 wherein said logic controller adjusts power on said battery bus in response to a signal from said BCM by signaling said HVEC module.

11. A circuit as in claim 1 wherein said HVEC module charges said high-voltage battery pack by maintaining said high-voltage battery pack SOC.

12. A circuit as in claim 1 wherein said logic controller has a high-voltage battery pack maintenance algorithm, which allows said logic controller to regulate the SOC on said high-voltage battery pack.

13. An operational method for a high-voltage energy converter (HVEC) module comprising:
   receiving an operational command signal;
   operating in a determined functional mode;
   voltage guarding a vehicle bus, a battery bus, and a water ethylene glycol (WEG) heater bus.

14. An operational method for a high-voltage energy converter (HVEC) module comprising:
   receiving an operational command signal;
   operating in a determined functional mode;
   voltage guarding a vehicle bus, a battery bus, and a water ethylene glycol (WEG) heater bus.

15. An operational method for a high-voltage energy converter (HVEC) module comprising:
   receiving an operational command signal;
   operating in a determined functional mode; and
   voltage guarding a vehicle bus, a battery bus, and a WEG heater bus comprising;
      monitoring voltages on said vehicle bus, said battery bus, and said WEG heater bus comprising;
         comparing voltage on said vehicle bus, said battery bus, and said heater bus with voltage guard limits; and
         signaling a logic controller that voltage guard limits are reached;
      comparing voltage levels on said vehicle bus, said battery bus, and said WEG heater bus;
      determining whether voltage transfer between said vehicle bus, said battery bus, and said WEG heater bus is feasible; and
      transferring power between said vehicle bus, said battery bus, and said WEG heater bus.

16. An operational method for a high-voltage energy converter (HVEC) module comprising:
   receiving an operational command signal;
   operating in a determined functional mode; and
   voltage guarding a vehicle bus, a battery bus, and a WEG heater bus comprising;
      monitoring voltages on said vehicle bus, said battery bus, and said WEG heater bus comprising;
         comparing voltage levels on said vehicle bus, said battery bus, and said WEG heater bus;
         determining whether voltage transfer between said vehicle bus, said battery, bus, and said WEG heater bus is feasible; and
         transferring power between said vehicle bus, said battery bus, and said WEG heater bus comprising;
            adjusting voltage on said vehicle bus, said battery bus, and said WEG heater bus to be within said voltage guard limits.

17. An operational method for a high-voltage energy converter (HVEC) module comprising:
   receiving an operational command signal;
   operating in a determined functional mode; and
   voltage guarding a vehicle bus, a battery bus, and a WEG heater bus comprising;
      monitoring voltages on said vehicle bus, said battery bus, and said WEG heater bus comprising;
         comparing voltage levels on said vehicle bus, said battery bus, and said WEG heater bus;
         determining whether voltage transfer between said vehicle bus,
      said battery bus, and said WEG heater bus is feasible; and transferring power between said vehicle bus, said battery bus, and said WEG heater bus while said HVEC module is in a constant voltage mode, a constant current mode, and a constant battery current mode.

18. A fuel cell energy system having a vehicle high-voltage bus comprising:
   a fuel cell electrically coupled to the vehicle high-voltage bus;
   a high-voltage energy converter (HVEC) module electrically coupled to the vehicle high-voltage bus;
   a battery-pack high-voltage bus electrically coupled to said HVEC module;
   a WEG heater high-voltage bus electrically coupled to said HVEC module;
   a high-voltage battery pack electrically coupled to said battery high-voltage bus;
   a water ethylene glycol (WEG) heater electrically coupled to said WEG heater high-voltage bus; and
   a logic controller electrically coupled to said HVEC module, said high-voltage battery pack, and said WEG heater circuit via a network, wherein said logic controller regulates the power on the vehicle high-voltage bus, the battery high-voltage bus, and the WEG heater high-voltage bus.

* * * * *